A. Morgan,
Metal Drill,

N° 3,187.    Patented July. 20, 1843.

UNITED STATES PATENT OFFICE.

AMOS MORGAN, OF WOOSTER, OHIO.

MACHINE FOR DRILLING IRON, &c.

Specification of Letters Patent No. 3,187, dated July 20, 1843.

*To all whom it may concern:*

Be it known that I, AMOS MORGAN, of Wooster, in the county of Wayne and State of Ohio, have invented a new and useful Machine for Drilling Metals; and I do hereby declare that the following is a full, clear, and exact description thereof, reference being had to the accompanying drawings, which form a part of this specification, in which—

Figure 1:
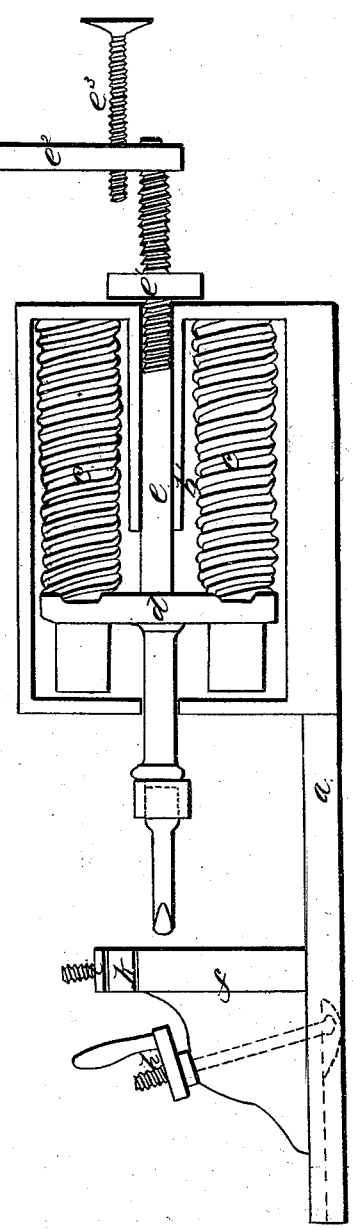
Figure 2:
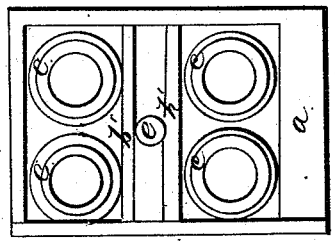
Figure 3:
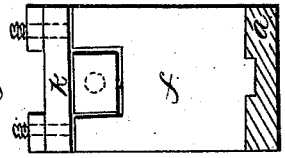

Figure 1, is a vertical section; Fig. 2 a cross section; Fig. 3, front view of rest.

The nature of my invention consists in connecting springs with a drill so as to be confined in a box and have a limited action; the stock of said drill being furnished with a screw and movable nut on it to draw back the drill when the hole is made. The springs serve to keep up the proper pressure of the drill on the iron while in operation.

The construction is as follows: An oblong plate ($a$) is formed with a box ($b$) at one end, (the side of this box is removed in Fig. 1,) in which there are two partitions ($b'$) far enough apart to leave room for the stock of the drill, and placed horizontally one above the other; they extend from the back of the box two thirds the length toward the front more or less; above and below the partitions ($b'$) two horizontal rods are placed side by side, around which strong spiral springs ($c$) are coiled; between the springs and the front of the box there is a plate ($d$) through which the rods above named are passed; the stock ($e$) of the drill also passes through it, and a shoulder on said stock bears against the front side of the plate ($d$); thus it will be seen that the springs bearing against the plate force forward the drill, and when that is drawn back, they are contracted; this is effected by means of a screw, cut on the rear end of the drill stock, and the nut ($e'$) on it, outside the box; on the extreme end of the stock there is a crank ($e^2$) by which it is turned; this has a thumb screw ($e^3$) through it running parallel with the stock and is set at the distance from the nut ($e'$) that it is to be turned back to in drilling; when the drill is to be drawn back a stop can be fixed to the back plate of the box to prevent the nut from turning, but when the drill is working this stop is withdrawn.

The plate ($a$) has a groove in its upper side, on the end opposite to the box ($b$) which is made to receive a tongue on a triangular formed rest ($f$), of the same width as the plate ($a$) said rest being made to slide back and forth by means of a rod ($h$) jointed to the plate ($a$) and extending up through a slot in the rest; a screw is cut on the upper end of said rod on which a nut is put, which as it is turned up forces forward the rest, and as it is unscrewed it allows the rest to fall back; the upper end of the rest has a square notch cut out of it (see Fig. 3,) and on each side are perpendicular rods furnished with screws and nuts ($i$); a cap ($k$) is fitted over the rods and is screwed down; the notch is made to receive bars that are to be drilled in the end.

What I claim as my invention and desire to secure by Letters Patent is—

The combination of the spring drill ($e$) with the set screw ($e^3$) and nut ($e'$) for gaging the depth which the drill is to enter and allowing it to feed as it bores and be drawn back rapidly.

AMOS MORGAN.

Witnesses:
J. J. GREENOUGH,
JOHN HITE.